United States Patent [19]
Moffitt et al.

[11] Patent Number: 5,233,458
[45] Date of Patent: Aug. 3, 1993

[54] METHOD AND APPARATUS TO REDUCE BINOCULAR RIVALRY IN A PARTIAL OVERLAP BINOCULAR DISPLAY

[75] Inventors: Kirk W. Moffitt, Sunnyvale; James E. Melzer, San Jose, both of Calif.

[73] Assignee: Kaiser Aerospace and Electronics Corporation, Oakland, Calif.

[21] Appl. No.: 723,865

[22] Filed: Jul. 1, 1991

[51] Int. Cl.$^5$ .................. G02B 26/02; G02B 27/00; A61B 3/08

[52] U.S. Cl. .................. 359/227; 359/407; 359/601; 351/201

[58] Field of Search .......... 359/362, 363, 575, 576, 359/404, 407–435, 462–482, 503–505, 629, 630–633, 227–236; 350/363–367, 399–410, 423–435, 462–482; 351/201–206, 240–246

[56] References Cited

U.S. PATENT DOCUMENTS

| | | | |
|---|---|---|---|
| 2,846,918 | 8/1958 | Miles | 359/505 |
| 2,925,751 | 2/1960 | Miles | 359/482 |
| 3,486,806 | 12/1969 | Werner | 359/404 |
| 3,680,946 | 8/1972 | Bellows | 359/505 |
| 4,037,921 | 7/1977 | Cox | 359/407 |
| 4,205,224 | 5/1980 | Mecklenborg | 250/201.1 |
| 4,264,122 | 4/1981 | Schmidt et al. | 359/412 |
| 4,323,298 | 4/1982 | Brennan | 359/411 |
| 4,509,832 | 4/1985 | Jacobsen | 359/669 |
| 4,729,648 | 3/1988 | Armstrong | 359/610 |
| 4,863,258 | 9/1989 | Greene | 351/201 |
| 4,886,347 | 12/1989 | Monroe | 359/413 |
| 4,968,120 | 11/1990 | Fournier, Jr. et al. | 359/630 |

FOREIGN PATENT DOCUMENTS 283493  4/1915  Fed. Rep. of Germany.

OTHER PUBLICATIONS

Melzer & Moffitt, "Partial Binocular-Overlap in Helmet-Mounted Displays," SPIE vol. 1117 Display System Optics II (1989).

Air Force Publication AD-A149641, "Wide-Field-of-View, Helmet-Mounted Infinity Display System Development," Dec., 1984, pp. 89–90.

*Primary Examiner*—Bruce Y. Arnold
*Assistant Examiner*—Thong Nguyen
*Attorney, Agent, or Firm*—Townsend and Townsend Khourie and Crew

[57] ABSTRACT

A method and apparatus for reducing the effects of binocular rivalry in a partially overlapped binocular image are disclosed. A false contour line is generated either electronically or mechanically along the border between the binocular and monocular images. This contour line reduces binocular rivalry in both convergent and divergent partially overlapped binocular displays.

9 Claims, 3 Drawing Sheets

METHOD AND APPARATUS TO REDUCE BINOCULAR RIVALRY IN A PARTIAL OVERLAP BINOCULAR DISPLAY

BACKGROUND OF THE INVENTION

This invention relates to the field of binocular viewing devices. More specifically, it relates to binocular viewing devices used in helmet-mounted displays.

In recent years, a great deal of effort has been spent on developing viable helmet-mounted displays ('HMD's). HMDs are the probable successor to head-up displays ('HUDs'). In a HUD, information which is normally displayed on cockpit instruments which require the pilot to look inside the airplane to read, compromising the pilot's ability to scan for targets or potential hazards outside the aircraft, is instead collected and displayed on a transparent panel mounted directly in front of the pilot.

Although HUDs certainly improve the situational awareness of pilots, they do have operational problems. The field of view tends to be relatively narrow. A pilot looking off to one side for a target or other aircraft will lose the data displayed on the HUD. Also, very intense sunlight can "wash out" the information displayed on the HUD. Although newer HUDs have mostly overcome this second problem, it is still not completely solved.

HMDs represent an attempt to improve upon HUDs. In very simplified form, an HMD comprises a helmet which incorporates the electronics and optics needed to create the flight symbology and to display this information directly in front of the pilot's eyes, along with other flight related equipment necessary to safeguard the pilot.

By placing the display directly in front of the pilot's eyes, the flight data symbology is not lost when the pilot turns his head, as the display moves with him. Although HMDs offer real advantages, many design problems still exist.

For the display of symbology on the HMD during daytime, it is likely that a relatively small field of view ('FOV') would suffice. However, for very low-level flight, often called nape-of-the-earth ('NOE') flight, especially night NOE, synthetic sensor-derived imagery may be needed. A narrow FOV will not suffice for such flight regimes. Unfortunately, an increase in FOV comes with an increase in the size and weight of the optical channels.

To date, HMDs have been used primarily in simulators, and have generated a large FOV. The relatively large size and weight of these systems is of little concern, as there is no requirement for crash safety, the g-forces in a simulator are minimal, and counterweights may be used to offset the head-supported weight. In contrast, the weight and center of gravity ('CG') requirements for operational HMDs may require much smaller and lighter systems.

In addition, future aviation requirements will impose severe competition for the area about the pilot's head and face. The helmet shield will have to provide increased impact, penetration and ballistic protection. The pilot will also have to wear protection from laser and flashblindness threats, and he may also have to wear a complete nuclear/biological/chemical protective suit. Some provision for head tracking may also be necessary, as well as a provision for night vision goggles to augment synthetic imagery. These headborne equipment requirements complicate the task of an HMD designer in terms of size, weight, and CG requirements.

It must be remembered that the helmet's primary purpose is life-support. An HMD should only be added if it does not compromise the protective capabilities of the helmet. Thus, although an HMD with a wide FOV is desirable, it cannot simultaneously endanger the pilot.

SUMMARY OF THE INVENTION

The present invention is a method for creating an HMD with an extended FOV which does not significantly increase the weight or complexity of either the helmet or the HMD created by following the steps of the method.

In a preferred embodiment of the present invention, two monocular images are provided to the display, the two images overlapping in a central region. Although displays using overlapping monocular images are known, the present invention provides a graphic false contour-line which reduces binocular rivalry, a known problem for such overlapping monocular displays.

The present invention will now be described in detail, with reference to the figures listed and described below.

DESCRIPTION OF THE SPECIFIC EMBODIMENT(S)

A fully-overlapped binocular display provides each eye with basically the same image. Small amounts of disparity may be introduced to produce a stereo effect. Each monocular display channel supports the entire FOV. However, this complicates the optical design as distortion increases with the square of the FOV. Other aberrations which grow with the field can only be corrected by the use of additional optical elements which add to overall weight and size. Probably the most difficult design problem with a wide FOV fully-overlapping monocular HMD is the necessary combining optics. These large optical components located in front of the eyes are heavy, unbalanced and difficult to package. Also, the size of these optical systems may preclude adjusting the HMD to accommodate small interpupillary distance.

Figure 1:
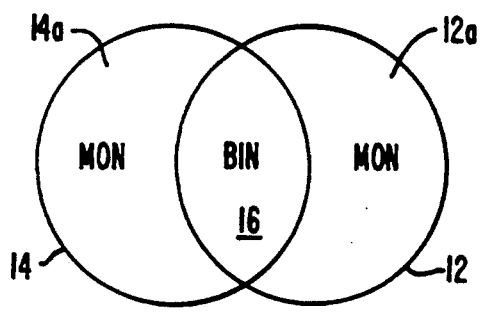
FIG. 1 is an example of binocular overlap to increase the FOV.

As an alternative to a fully-overlapped binocular display, the monocular images may be displaced inwards or outwards to create partial binocular overlap. This method creates a central binocular region with flanking monocular regions If 50% of each monocular image is overlapped, the FOV increases by 50%. As shown in FIG. 1, two monocular images 12 and 14 each with a 40° FOV, when they are overlapped by 50% (20°) results in a 20° binocular region 16 flanked by the two 20° monocular regions 12a and 14a. In this way, a 60° horizontal FOV is obtained using two 40° optical channels. When used with an HMD, this partial binocular overlap allows smaller and lighter optics to be used while still producing a wide FOV.

Partial binocular overlap exists in most biological vision systems. For example, in human beings, approximately 120° of the horizontal visual field is binocular, with 35° flanking monocular fields.

Figure 2A:
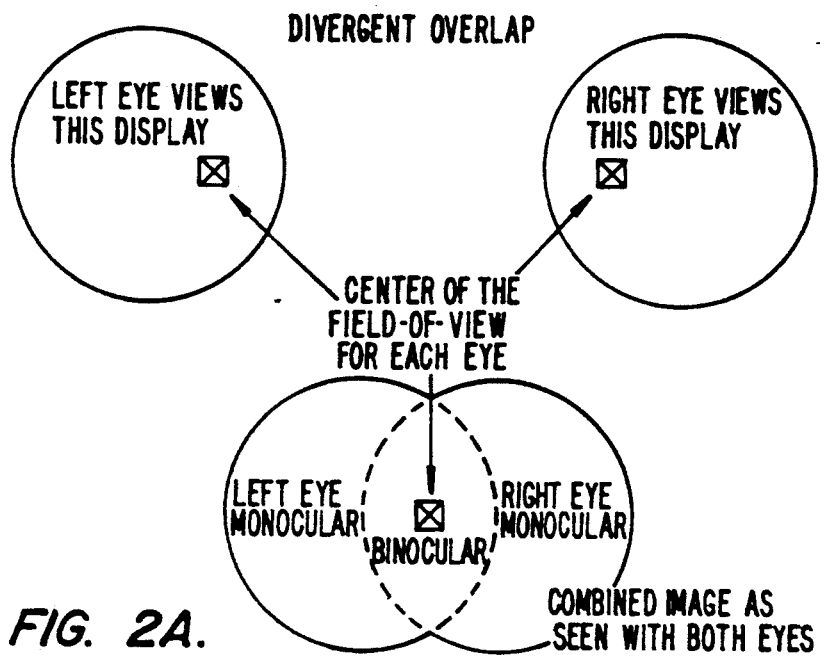
FIG. 2A and 2B portray divergent and convergent partial binocular overlapping displays, respectively.
Figure 2B:
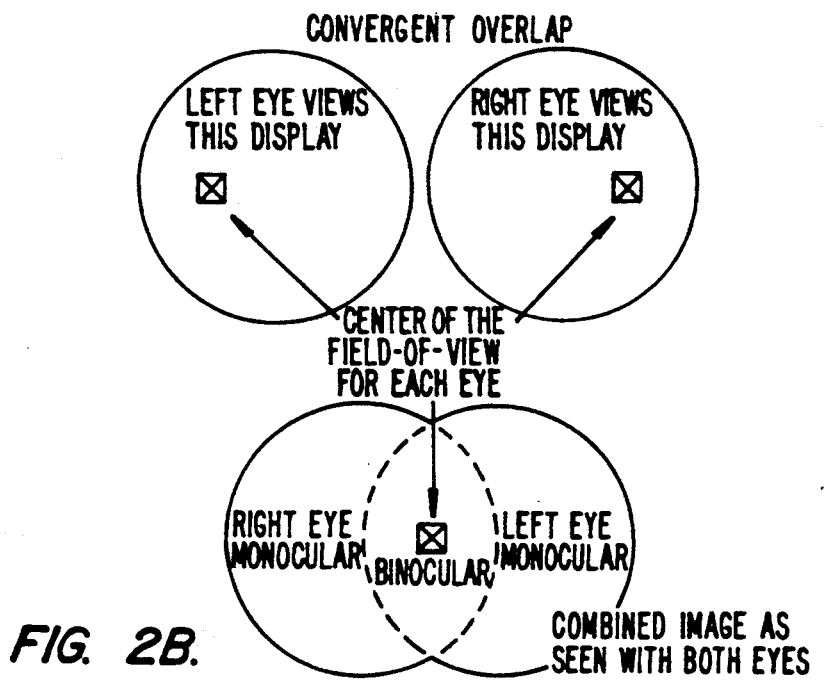

Partial binocular overlap may have convergent or divergent imagery. As shown in FIG. 2A, with divergent imagery, the left eye views the central binocular region and the left monocular region, while the right eye views the central binocular region and the right monocular region. A divergent display is analogous to viewing a near object against a more distant background. With convergent imagery, the left eye views a central binocular region and a monocular region to the right, while the right eye views the central binocular region and the monocular region to the left. A convergent display is analogous to looking through an aperture at a more distant scene.

A major problem with a partial overlapping display is that the difference in the imagery seen by each eye creates a perceptual conflict. Where one eye sees the edge of the central binocular image, the other eye sees continuous imagery. The edge and the continuous imagery rival each other, creating intermittent visual suppression. The perceptual effect is that the continuous imagery seen by one eye alternates with the edge and dark surrounding area seen by the other eye. Given a central binocular region and flanking monocular regions of circular displays, the viewer sees two crescent-shaped dark regions alternating with continuous display imagery. This effect has been referred to as luning.

The magnitude of rivalry or luning is dependent on whether the partial-overlap binocular display is a convergent or divergent display. Research indicates that more rivalry is experienced with a divergent than with a convergent display. This may be caused by the discrepancy between the continuous imagery of a divergent partial-overlap display and the binocular arrangement of a close object viewed against a background. To most viewers, a divergent display may appear to be ecologically invalid as it does not correspond to a natural scene. In contrast, continuous imagery is compatible with a convergent display and with viewing an object through an aperture, thereby attenuating the rivalry.

Figure 3A:
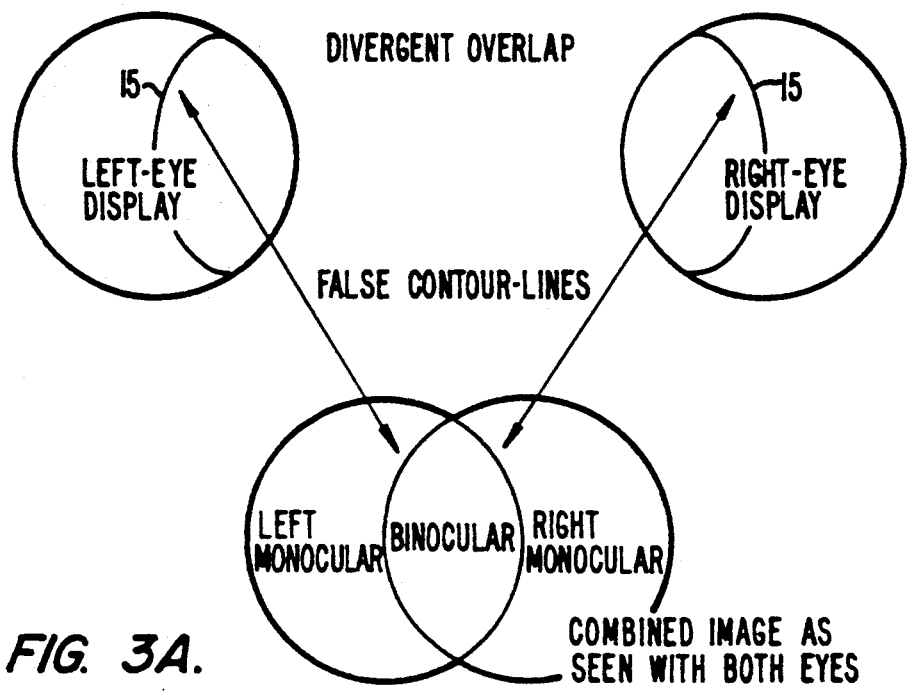
FIG. 3A shows two monocular images with false contour lines drawn according to the teachings of the present invention and the resultant partial-overlap display.

The present invention comprises false contour-lines which reduce rivalry in binocular partial overlap displays. With a divergent display, as shown in FIG. 3A, a false contour line 15 is generated on each monocular image. These contour lines correspond to the binocular edge of the opposite eye's image. When used with a divergent display, these graphical contour lines demarcate the binocular region, mimicking the outlines of a near object and restoring ecological validity to the display. This demarcation serves to inhibit the rivalry that would result from the otherwise conflicting imagery.

Figure 3B:
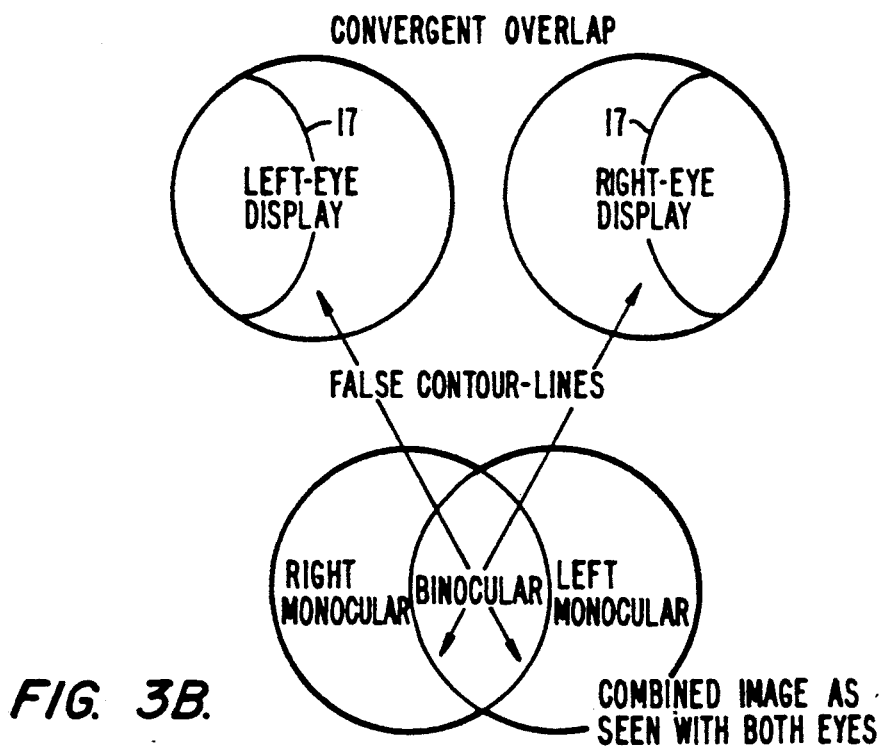
FIG. 3B shows another embodiment of the invention when used with a convergent display.

As shown in FIG. 3B, graphic contour lines 17 can also attenuate rivalry when used with convergent displays, although the improvement is less dramatic than with divergent displays.

The apparatus to produce these graphic contour lines can be as simple as placing a reticle in the optic train which receives the image, or, where each monocular image is generated electronically, programming the display unit to generate the lines automatically. As the location of the contour lines is constant, regardless of whether the HMD is moved, programming the display is a straightforward matter.

Figure 4:
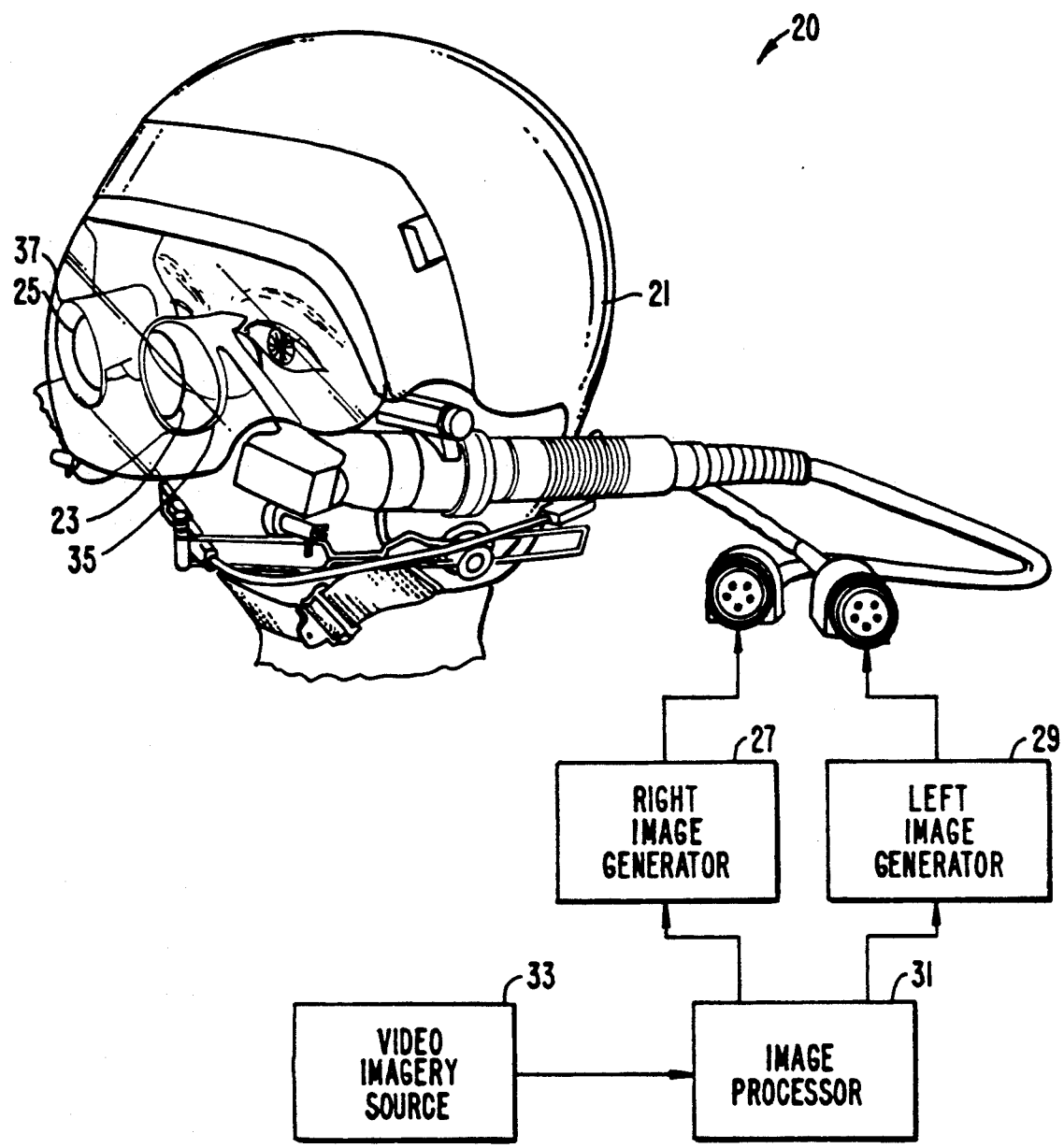
FIG. 4 shows the apparatus which comprises one embodiment of the present invention.

A preferred embodiment of the present invention is shown in FIG. 4. System 20 comprises helmet 21, right and left eyepieces 23 and 25, right and left image generators 27 and 29, image processor 31, and video imagery source 33. The information to be displayed on eyepieces 23 and 25 is initially a single video image. Image processor 31 converts imagery into right and left image data. Right and left image generators 27 and 29 format the image data as appropriate and transmit the formatted image data to right and left eyepieces 23 and 25, which display the formatted image data. Thus, the contour lines 35, 37 can be generated electronically by image processor 31 or by forming them directly on the image plane of the eyepieces 23 and 25.

Although a particular embodiment of the invention has been described and illustrated herein, it is recognized that modifications and variations may readily occur to those skilled in the art. Consequently, it is intended that the claims be interpreted to cover such modifications and variations.

What is claimed is:

1. In a partial overlap binocular display, a method for reducing rivalry comprising the steps of:
   generating a first monocular image;
   generating a second monocular image;
   overlapping a predefined portion of the second monocular image over a predefined portion of the first monocular image; and
   generating contour lines at the outer edges of the overlapping predefined portion of the first and second images.

2. The method of claim 1 wherein the first and second monocular images overlap to form a convergent overlapped image.

3. The method of claim 1 wherein the first and second monocular images overlap to form a divergent overlapped image.

4. The method of claim 1 wherein the contour lines are generated electronically.

5. The method of claim 1 wherein the contour lines are formed by a reticle at the image plane of the first and second monocular images.

6. An apparatus for reducing luning in a partial overlap binocular display comprising:
   means for generating a first monocular image;
   means for generating a second monocular image;
   means for overlapping predefined portions of the first and second monocular images, creating a central overlapped image with outer edges; and
   means for generating contour lines at the outer edges of the central overlapped image.

7. The apparatus of claim 6 wherein the contour lines are generated by a reticle.

8. The apparatus of claim 6 wherein the contour lines are generated electronically.

9. A display system for producing from first and second monocular images a binocular display for viewing by a user, the binocular display having a partial overlap, comprising:
   means for generating the first and second monocular images;
   means optically coupled to the generating means to display the first and second monocular images for viewing by the user in a partial overlap manner, forming thereby a viewable overlapped portion of the first and second monocular images; and
   means for forming for each monocular image a visually perceptible contour line that defines the overlapped portion for resolving image rivalry in the partial overlap.

* * * * *